(No Model.)
J. DOBSON.
GRADE ROD.
No. 583,430.   Patented May 25, 1897.
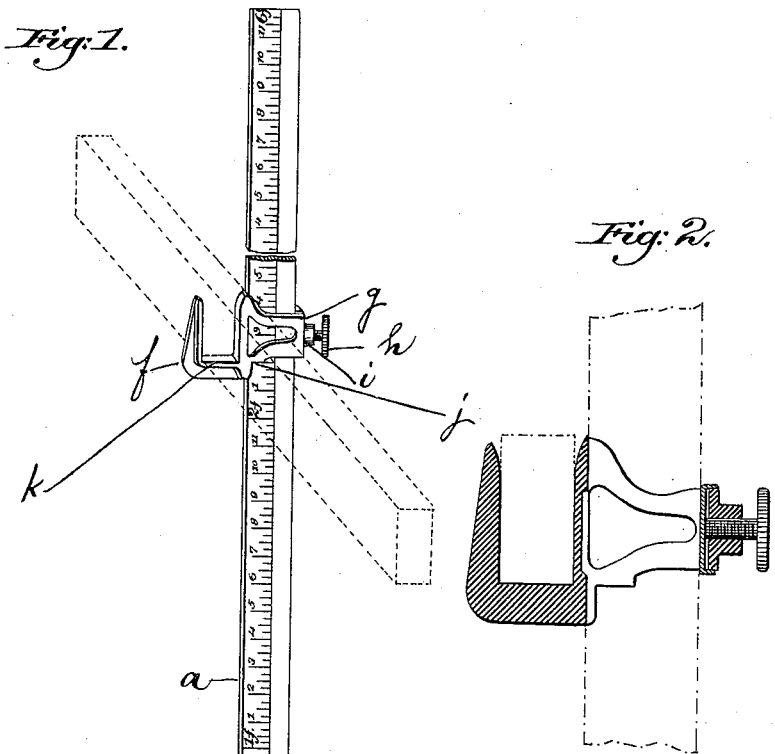
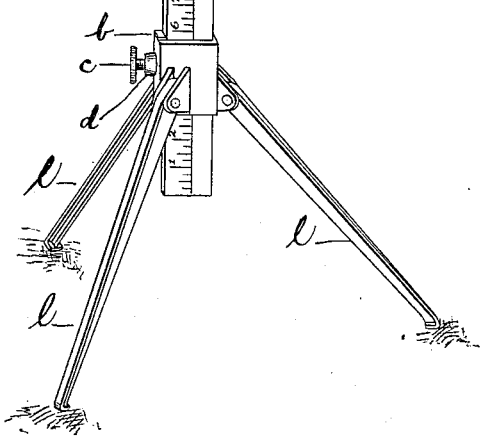

UNITED STATES PATENT OFFICE.

JOB DOBSON, OF BOSTON, MASSACHUSETTS, ASSIGNOR TO WILLIS E. BLOUNT, OF PAWTUCKET, RHODE ISLAND.

GRADE-ROD.

SPECIFICATION forming part of Letters Patent No. 583,430, dated May 25, 1897.

Application filed June 27, 1896. Serial No. 597,179. (No model.)

*To all whom it may concern:*

Be it known that I, JOB DOBSON, of Boston, in the county of Suffolk and State of Massachusetts, have invented certain new and useful Improvements in Grade-Rods, of which the following is a description sufficiently full, clear, and exact to enable those skilled in the art to which it appertains or with which it is most nearly connected to make and use the same.

The object of this invention is to provide an implement to be used by engineers or mechanics in laying pipes for water distribution or for sewers, by means of which the pipes may be laid at a certain depth or level relatively to a fixed point.

In laying the pipes of a water-distributing or sewer system in a street, the level and contour of which has been previously ascertained, it has been the practice to affix marks at regular intervals along the street to one side of the line of the trench to be dug and to direct that the axial line of the pipe shall be at a certain distance below each respective mark. It has been, therefore, necessary to project the line of the mark horizontally over the trench and to measure down the required distance therefrom. In projecting this line it was usual to level a straight-edge from the mark over the trench, except where there was an obstruction in the way, and then it was necessary to level the straight-edge an arbitrary distance above the ground and to then add that distance to the required depth of the pipe below the mark to ascertain the level of the pipe. This mode of finding the level of the pipes was laborious, since there are no simple tools such as a mechanic can use which may be employed for the purpose, except a straight-edge and a level, and, moreover, it required two or more persons, one at each end of the straight-edge.

This invention therefore consists of a graduated rod provided with an adjustable support for the straight-edge and being itself adjustably mounted in a tripod, which shall be employed in the manner and for the purposes as I shall now proceed to set forth in detail.

Reference is to be had to the annexed drawings, and to the letters marked thereon, forming a part of this specification, the same letters designating the same parts or features, as the case may be, wherever they occur.

Of the drawings, Figure 1 is a perspective view of a grade-rod or implement constructed in accordance with my invention. Fig. 2 is an enlarged section through the adjustable support for the straight-edge.

In carrying out my invention I employ a rod $a$, which is of any suitable length and which is divided into feet and inches. It is adjustably supported at its lower end in a tripod consisting of a square collar $b$, through which passes a clamping-screw $c$, bearing against a clamping-shoe $d$, so as not to injure the rod. By loosening the screw $c$ the rod $a$ may be adjusted up and down and then secured after adjustment. Legs $l$ are hinged to the collar for supporting the rod in a vertical position. I secure to the rod an adjustable holder for a bar or a straight-edge, which consists of a bracket $f$, having a square sleeve $g$ surrounding the rod, through which a setscrew $h$ passes and bears against a clamping-shoe $i$, so as to hold the bracket at any desired height along the rod. The sleeve $g$ is formed with an edge $j$, which is in alinement with the top face $k$ of the bottom of the bracket and which lies over the line of graduations on the rod, so as to register with any one thereof to show the position of the bracket with relation thereto.

The manner of using the rod is as follows: Let it be supposed that it is desired to lay a pipe six feet below the top of the grade-mark and that there is a slope between the grade-mark and the line of the trench. The tripod is placed above the grade-mark and the rod is adjusted until its bottom touches the top of the same. The bracket is adjusted to any desired height, say three feet. A similar rod is stood up near the trench and a straight-edge is laid in the brackets. The bracket of the last-mentioned rod is raised or lowered until the straight-edge is exactly horizontal, a spirit-level being employed for this purpose. Then from the straight-edge the distance may be measured down to the bottom of the trench, the three feet being deducted from the total distance to ascertain the depth of the trench or where to lay the pipe.

Having thus explained the nature of the invention and described a way of constructing and using the same, though without attempting to set forth all of the forms in which it may be made or all of the modes of its use, it is declared that what is claimed is—

An implement of the character described, consisting of a support, as a tripod, to rest upon the surface of the ground, a graduated vertical rod adjustable in the said support whereby the lower end of the rod may be brought to bear upon the grade-mark, irrespective of the position of the support, a collar surrounding said rod and adjustable therealong, a bracket for the support of graduation-rod connected with the said collar, a set-screw for fixing or adjusting the collar in place, the said collar being provided with a straight edge in alinement with the top face of the bracket, and adapted to register with the scale or graduation-marks on the said vertical rod, substantially as and for the purpose hereinbefore set forth.

In testimony whereof I have signed my name to this specification, in the presence of two subscribing witnesses, this 28th day of March, A. D. 1896.

JOB DOBSON.

Witnesses:
ARTHUR W. CROSSLEY,
C. C. STECHER.